United States Patent
Edman et al.

(10) Patent No.: US 11,584,357 B2
(45) Date of Patent: Feb. 21, 2023

(54) POWERTRAIN CONTROL TO PRECLUDE THERMAL-RELATED REDUCED OPERATION

(71) Applicant: Ford Global Technologies, LLC, Dearborn, MI (US)

(72) Inventors: Rian Edman, Dearborn, MI (US); Kelly Johnson, Northville, MI (US); Gregory Dean Ognjanovski, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 16/996,467

(22) Filed: Aug. 18, 2020

(65) Prior Publication Data

US 2022/0055608 A1    Feb. 24, 2022

(51) Int. Cl.
| | |
|---|---|
| *H01M 10/613* | (2014.01) |
| *B60W 20/15* | (2016.01) |
| *B60W 10/30* | (2006.01) |
| *B60W 10/26* | (2006.01) |
| *B60W 10/08* | (2006.01) |
| *B60W 10/06* | (2006.01) |
| *H01M 10/44* | (2006.01) |
| *B60L 53/62* | (2019.01) |

(52) U.S. Cl.
CPC ............ *B60W 20/15* (2016.01); *B60W 10/06* (2013.01); *B60W 10/08* (2013.01); *B60W 10/26* (2013.01); *B60W 10/30* (2013.01); *B60L 53/62* (2019.02); *B60L 2260/56* (2013.01); *B60W 2510/244* (2013.01); *H01M 10/44* (2013.01); *H01M 10/613* (2015.04)

(58) Field of Classification Search
CPC . H01M 10/44; H01M 10/613; B60L 2260/56; B60L 53/62; B60W 20/15; B60W 10/06; B60W 10/08; B60W 10/26; B60W 10/30; B60W 2510/244
See application file for complete search history.

(56) References Cited

U.S. PATENT DOCUMENTS

| | | | |
|---|---|---|---|
| 10,118,460 B1* | 11/2018 | Blatchley | B60H 1/00428 |
| 10,800,398 B2* | 10/2020 | Duan | B60W 10/08 |
| 11,075,414 B2* | 7/2021 | Yokotsuji | B60L 3/0046 |
| 2006/0061922 A1 | 3/2006 | Mihai et al. | |
| 2012/0247716 A1* | 10/2012 | Galtz | B60L 3/003 165/41 |
| 2019/0221899 A1* | 7/2019 | Tomai | B60L 3/0023 |

FOREIGN PATENT DOCUMENTS

GB    2487733 A    8/2012

* cited by examiner

*Primary Examiner* — Gonzalo Laguarda
(74) *Attorney, Agent, or Firm* — David B. Kelley; Brooks Kushman P.C.

(57) ABSTRACT

A vehicle may include an engine, a traction battery, an electric motor, an electric cooling system, and a controller. The electric motor selectively converts torque from the engine to electric power and converts electric power from the traction battery to drive torque for the vehicle. The electric cooling system, responsive to a temperature of the traction battery exceeding a first threshold, cools the traction battery using the electric power. The controller, responsive to the temperature exceeding a second threshold less than the first threshold and accessory loads exceeding a third threshold, operates one or both of the engine and traction battery to maintain the temperature below the first threshold.

20 Claims, 2 Drawing Sheets

POWERTRAIN CONTROL TO PRECLUDE THERMAL-RELATED REDUCED OPERATION

TECHNICAL FIELD

This disclosure relates to strategies for controlling an automotive vehicle powertrain that includes an electric motor and traction battery.

BACKGROUND

Certain vehicles may include a traction battery and one or more electric motors for propulsion. The traction battery is the source of power for the one or more electric motors. Operation of the traction battery may generate heat. Temperature control systems may be arranged to cool (or heat) the traction battery as necessary.

SUMMARY

A vehicle includes an engine, a traction battery, an electric motor, an electric cooling system, and a controller. The electric motor selectively converts torque from the engine to electric power and converts electric power from the traction battery to drive torque for the vehicle. The electric cooling system, responsive to a temperature of the traction battery exceeding a first threshold, cools the traction battery using the electric power. The controller, responsive to the temperature exceeding a second threshold less than the first threshold and accessory loads exceeding a third threshold, operates one or both of the engine and traction battery to maintain the temperature below the first threshold. The second threshold depends on the accessory loads such that as the accessory loads increase, the second threshold decreases.

A method for controlling a vehicle includes selectively converting torque from an engine to electric power, and electric power from a traction battery to drive torque for the vehicle. The method also includes cooling the traction battery using the electric power responsive to a temperature of the traction battery exceeding a first threshold. The method further includes operating one or both of the engine and traction battery to maintain the temperature below the first threshold responsive to the temperature exceeding a second threshold less than the first threshold and accessory loads exceeding a third threshold. The third threshold depends on the temperature such that as the temperature increases, the third threshold decreases.

A vehicle includes an engine, a traction battery, an electric cooling system, and a controller. The electric cooling system cools the traction battery using electric power responsive to a temperature of the traction battery exceeding a first threshold. The controller, responsive to the temperature exceeding a second threshold less than the first threshold and accessory loads exceeding a third threshold, increases a minimum state of charge threshold of the traction battery. The second threshold depends on the accessory loads such that as the accessory loads increase, the second threshold decreases.

DETAILED DESCRIPTION

Figure 1:
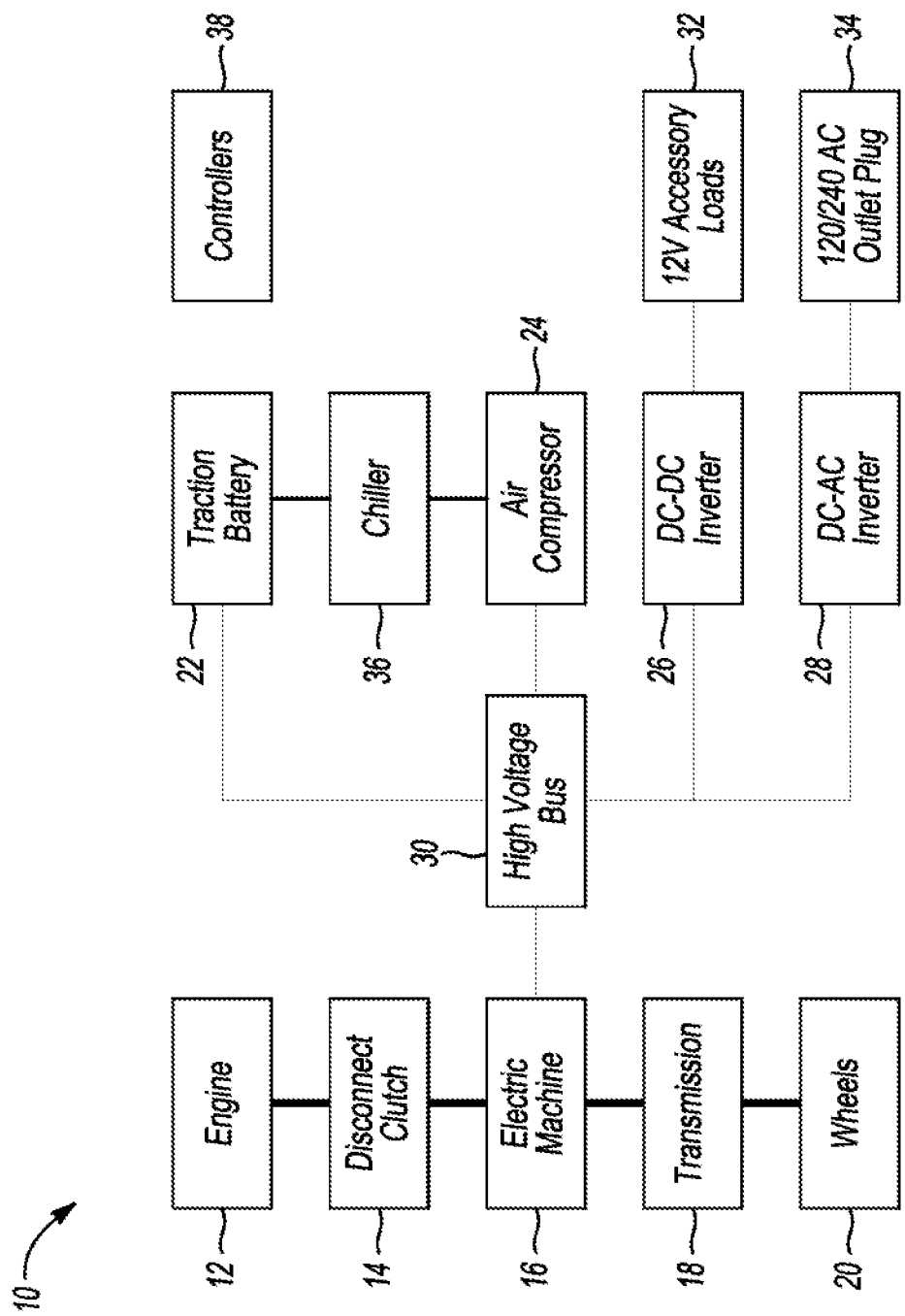
FIG. 1 is schematic diagram of a vehicle.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

On certain types of vehicles (e.g., hybrid electric vehicles, etc.), energy for accessory loads is provided by a high voltage electrical bus. Consumers of this energy can include, among other things, a DC-AC inverter, a DC-DC inverter, and an electric air compressor arranged to operate during cabin cooling and traction battery cooling.

The high voltage electrical bus can be supplied energy by way of an engine and an electric motor, both of which may experience increased temperatures, which can impact subsystem performance and lead to conditions in which more electrical power is demanded from the high voltage electrical bus than is supplied to the high voltage electrical bus. This energy deficit can be supplied by the traction battery on a short term basis. Eventually, certain loads may be shed to reduce demand and avoid potential increases in traction battery temperature.

For some vehicles, it is thus possible that running high accessory loads at low vehicle speeds can lead to load shedding or otherwise reduced system performance, particularly in circumstances in which flow of coolant over motor hardware is low. Stop and go city traffic in hot ambient environments is one example of conditions that may result in the load shedding or otherwise reduced system performance described above.

Repeatedly using a traction battery to support deficits in electrical power due to lack of sufficient motor torque during thermal de-rated operation may increase current through the traction battery and result in high heat rejection from the traction battery. (The ability of an electric motor to convert torque to electric power may decrease as temperature of the electric motor increases.) High traction battery heat rejection may increase use of any battery chiller arranged to cool the traction battery, which may increase torque loading on the electric motor-compounding the situation.

Here, controls strategies are described to prevent load shedding or otherwise reduced system performance. The proposed control strategies may, for example, modify the engine pull up threshold (the demand threshold at which an engine is started), energy management, and/or motor boost strategies of a powertrain based on parameters such as battery temperature and instantaneous accessory loads on the system.

As battery temperatures increase, engine pull up threshold and energy requested from a traction battery can be reduced as a function of total accessory load. A modified motor boost calibration can also be activated to prevent depletion of the traction battery and maintain a higher minimum state of charge of the traction battery to act as a buffer if a thermal de-rate condition happens to occur.

Modified engine pull up strategy: Starting an engine and keeping it on may offer multiple benefits to mitigating thermal stress on an electric motor when conditions are less than favorable. Having the engine on to support driver demanded wheel torque may reduce the amount of power required from a traction battery for propulsive torque at low speeds. This reduction in power demand may reduce heat rejected from the traction battery and delay onset of battery chiller operation.

Modified energy management strategy: Utilizing a modified energy management strategy may allow the flexibility to not charge from a traction battery when the system is operating at the limits of its thermal capability. Minimizing current throughput potentially trades off any hybrid operation and fuel economy for the ability to support all high voltage loads on a high voltage electrical bus, including features like climate control, etc.

Modified motor boost strategy: A motor boost strategy may ordinarily utilize a traction battery pack to support transient heavy acceleration requests from a driver to deliver peak powertrain performance. In less than favorable thermal conditions, output from an electric motor is inhibited, trading off this performance for the ability to maintain all high voltage loads on a high voltage electrical bus, along with the aforementioned features.

With reference to FIG. 1, an automotive vehicle 10 includes an engine 12, a disconnect clutch 14, an electric machine 16, a transmission 18, and wheels 20. The disconnect clutch 14 is mechanically coupled with the engine 12 and electric machine 16. The transmission 18 is mechanically coupled with the electric machine 16 and wheels 20. The engine 12 and electric machine 16 are thus arranged in series and can be used individually or in tandem to drive the wheels 20 via the transmission 18. With the disconnect clutch 14 open, the electric machine 16 may generate torque to drive the wheels 20. With the disconnected clutch 14 closed, the engine 12 and electric machine 16 may generate torque to drive the wheels 20, or the engine 12 may generate torque to drive the wheels 20 alone if the electric machine 16 is in a passive state.

The automotive vehicle 10 also includes a traction battery 22, an air compressor 24, a DC-DC inverter 26, a DC-AC inverter 28, and a high voltage bus 30. The high voltage bus 30 is electrically connected with the electric machine 16, the traction battery 22, the air compressor 24, the DC-DC inverter 26, and the DC-AC inverter such that high voltage electric power may be exchanged therebetween. The electric machine 16 during regenerative braking may generate electricity that can be stored in the traction battery 22. The engine 12 may also drive the electric machine 16 to generate electricity that can be stored in the traction battery 22 or used by the air compressor 24, DC-DC inverter 26, DC-AC inverter 28, etc. (the accessory loads).

The automotive vehicle 10 further includes 12V accessory loads 32, an outlet plug 34, a chiller 36, and one or more controllers 38. The 12V accessory loads 32 are electrically connected with the DC-DC inverter 26. The outlet plug 34 is electrically connected with the DC-AC inverter 28.

The chiller 36 is in thermal communication with the traction battery 22 and air compressor 24 such that consumption of high voltage electric power by the air compressor 24 can result in cooling of the traction battery 22 via operation of the chiller 36.

The controllers 38 (e.g., powertrain controller, body controller, etc.) are in communication with and control the various elements shown in FIG. 1. Standard wired or wireless networking technology facilitates the communication and control. The various operations described herein can result from commands issued by the controllers 38. Additionally, the algorithms described below can be implemented by the controllers 38.

Figure 2:
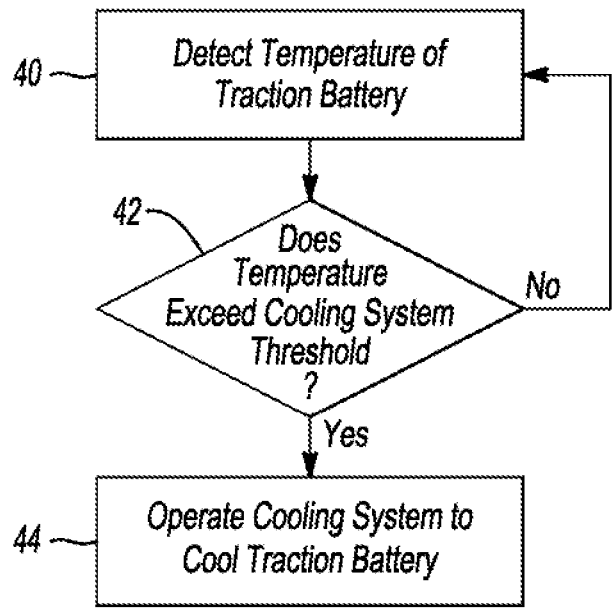
FIG. 2 is a flow chart of an algorithm for controlling operation of a vehicle cooling system.

With reference to FIG. 2, the temperature of the traction battery may be detected at operation 40. Standard sensors, for example, may be operatively arranged with the traction battery to sense temperature. Such data may then be communicated to the controllers 38 via a communication network (e.g., car area network, Ethernet, etc.) At decision block 42, it is determined whether the temperature exceeds a cooling system threshold (e.g., 40° C.). If no, the algorithm returns to operation 40. If yes, the cooling system (e.g., the air compressor and chiller) is operated to cool the traction battery.

Figure 3:
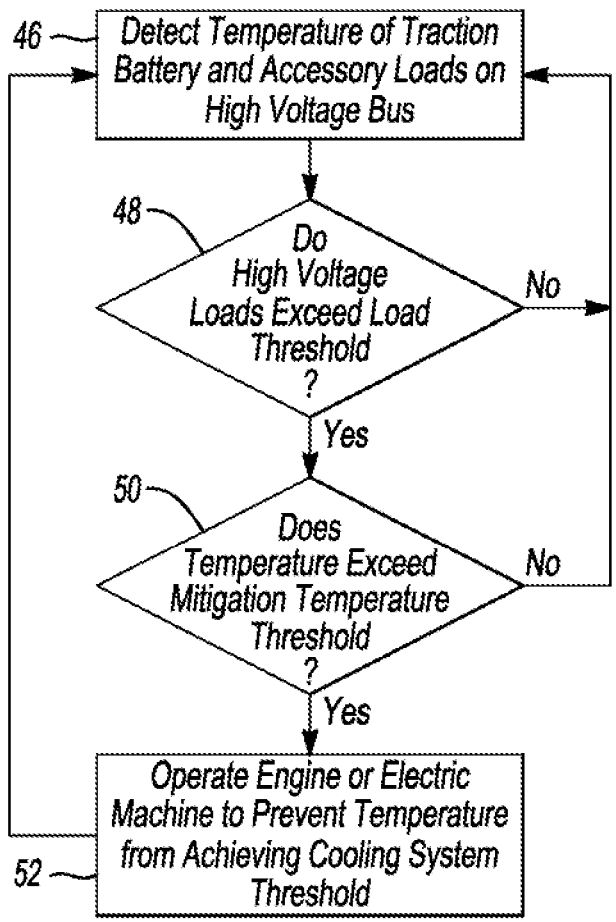
FIG. 3 is a flow chart of an algorithm for controlling operation of an engine and traction battery.

With reference to FIG. 3, the temperature of the traction battery and the accessory loads on the high voltage bus may be detected at operation 46. Current and/or voltage sensors may be operatively arranged with the high voltage bus to sense electrical loads thereon. Such data may then be communicated to the controllers 38 via the communication network. At operation 48, it is determined whether the high voltage loads exceed a load threshold (e.g., 200V). If no, the algorithm returns to operation 46. If yes, it is determined at operation 50 whether the temperature of the traction battery exceeds a mitigation temperature threshold (e.g., something less than the cooling system threshold). If no, the algorithm returns to operation 46. If yes, the engine or electric machine are operated to prevent the temperature of the traction battery from achieving the cooling system threshold at operation 52. In such circumstances, the electric motor may be prevented from satisfying driver requests for boost power Operation of the engine or electric machine as mentioned above may include decreasing a pull up threshold of the engine, reducing current draw from the traction battery, increasing a minimum state of charge threshold of the traction battery, and/or decreasing a maximum state of charge threshold of the traction battery.

Here, the load threshold and the mitigation temperature threshold may be functions of other parameters. That is, the mitigation temperature threshold may decrease as the accessory loads on the high voltage bus increase, and vice versa. Likewise, the load threshold may decrease as the traction battery temperature increases, and vice versa. A look-up table or other suitable technique may be used to select the thresholds as a function of the parameters mentioned.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. The terms "controller" and "controllers," for example, may be used interchangeably.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine;
   a traction battery;
   an electric motor configured to selectively convert torque from the engine to electric power and convert electric power from the traction battery to drive torque for the vehicle;
   an electric cooling system configured to, responsive to a temperature of the traction battery exceeding a first threshold, cool the traction battery using the electric power;
   a sensor configured to measure accessory loads; and
   a controller configured to, responsive to the temperature exceeding a second threshold less than the first threshold and the accessory loads exceeding a third threshold, operate one or both of the engine and traction battery to maintain the temperature below the first threshold, wherein the second threshold depends on the accessory loads such that as the accessory loads increase, the second threshold decreases.

2. The vehicle of claim 1, wherein the third threshold depends on the temperature such that as the temperature increases, the third threshold decreases.

3. The vehicle of claim 1, wherein operating one or both of the engine and traction battery to maintain the temperature below the first threshold includes decreasing a pull up threshold of the engine.

4. The vehicle of claim 1, wherein operating one or both of the engine and traction battery to maintain the temperature below the first threshold includes reducing current draw from the traction battery.

5. The vehicle of claim 1, wherein operating one or both of the engine and traction battery to maintain the temperature below the first threshold includes increasing a minimum state of charge threshold of the traction battery.

6. The vehicle of claim 1, wherein operating one or both of the engine and traction battery to maintain the temperature includes decreasing a maximum state of charge threshold of the traction battery.

7. The vehicle of claim 1, wherein the controller is further configured to, responsive to the temperature exceeding the second threshold and the accessory loads exceeding the third threshold, inhibit the electric motor from satisfying driver requests for boost power.

8. A method for controlling a vehicle comprising:
   by an electric motor, selectively converting torque from an engine to electric power, and electric power from a traction battery to drive torque for the vehicle;
   by an electric cooling system, cooling the traction battery using the electric power responsive to a temperature of the traction battery exceeding a first threshold;
   by a sensor, measuring accessory loads; and
   by a controller, operating one or both of the engine and traction battery to maintain the temperature below the first threshold responsive to the temperature exceeding a second threshold less than the first threshold and the accessory loads exceeding a third threshold, wherein the third threshold depends on the temperature such that as the temperature increases, the third threshold decreases.

9. The method of claim 8, wherein the second threshold depends on the accessory loads such that as the accessory loads increase, the second threshold decreases.

10. The method of claim 8, wherein operating one or both of the engine and traction battery to maintain the temperature below the first threshold includes decreasing a pull up threshold of the engine.

11. The method of claim 8, wherein operating one or both of the engine and traction battery to maintain the temperature below the first threshold includes reducing current draw from the traction battery.

12. The method of claim 8, wherein operating one or both of the engine and traction battery to maintain the temperature below the first threshold includes increasing a minimum state of charge threshold of the traction battery.

13. The method of claim 8, wherein operating one or both of the engine and traction battery to maintain the temperature below the first threshold includes decreasing a maximum state of charge threshold of the traction battery.

14. The method of claim 8 further comprising, responsive to the temperature exceeding the second threshold and the accessory loads exceeding the third threshold, inhibiting the electric motor from satisfying driver requests for boost power.

15. A vehicle comprising:
   an engine;
   a traction battery;
   an electric cooling system configured to cool the traction battery using electric power responsive to a temperature of the traction battery exceeding a first threshold;
   a sensor configured to measure accessory loads; and
   a controller configured to, responsive to the temperature exceeding a second threshold less than the first threshold and the accessory loads exceeding a third threshold, increase a minimum state of charge threshold of the traction battery, wherein the second threshold depends on the accessory loads such that as the accessory loads increase, the second threshold decreases.

16. The vehicle of claim 15, wherein the third threshold depends on the temperature such that as the temperature increases, the third threshold decreases.

17. The vehicle of claim 15, wherein the controller is further configured to, responsive to the temperature exceeding the second threshold and the accessory loads exceeding the third threshold, decrease a pull up threshold of the engine.

18. The vehicle of claim 15, wherein the controller is further configured to, responsive to the temperature exceeding the second threshold and the accessory loads exceeding the third threshold, reduce current draw from the traction battery.

19. The vehicle of claim 15 further comprising an electric motor configured to selectively convert torque from the engine to electric power and convert electric power from the traction battery to drive torque for the vehicle, wherein the controller is further configured to, responsive to the temperature exceeding the second threshold and the accessory loads exceeding the third threshold, inhibit the electric motor from satisfying driver requests for boost power.

20. The vehicle of claim 15, wherein the controller is further configured to, responsive to the temperature exceeding the second threshold and the accessory loads exceeding the third threshold, decrease a maximum state of charge threshold of the traction battery.

* * * * *